United States Patent [19]
Ide et al.

[11] Patent Number: 5,841,899
[45] Date of Patent: Nov. 24, 1998

[54] SPECIFIC COLOR FIELD RECOGNITION APPARATUS AND METHOD

[75] Inventors: Kenichi Ide, Tokyo; Takahisa Nakano, Yokohama, both of Japan

[73] Assignee: Kabushiki Kaisha Toshiba, Kawasaki, Japan

[21] Appl. No.: 700,097

[22] Filed: Aug. 20, 1996

[30] Foreign Application Priority Data

Aug. 21, 1995 [JP] Japan ................................. 7-212159

[51] Int. Cl.$^6$ ............................. G06K 9/00; G06K 9/34
[52] U.S. Cl. ........................ 382/168; 382/163; 382/164; 382/171
[58] Field of Search ................................. 382/162, 163, 382/164, 165, 168, 169, 170; 358/522

[56] References Cited

U.S. PATENT DOCUMENTS

| | | | |
|---|---|---|---|
| 4,577,218 | 3/1986 | Kurata | 358/500 |
| 5,376,800 | 12/1994 | Solares et al. | 250/472.1 |

Primary Examiner—Jose L. Couso
Assistant Examiner—Dmitry A. Novik
Attorney, Agent, or Firm—Cushman Darby & Cushman Intellectual Property Group Of Pillsbury Madison & Sutro LLP

[57] ABSTRACT

A specific color field recognition apparatus and method are disclosed. A mechanism fetches a first image including a specific color and a second image with the specific color eliminated therefrom by picking up an image of an object having a specific color field to be recognized. A device produces a first density histogram and a second density histogram representing the number of pixels for each tone with respect to the first image and the second image, respectively. A converter determines a plurality of local maxima in the first and second images and converts the density of the first and second images in such a manner at the first image a background portion which is lowest density of the local maxima represents minimum of the gradation field, label portion which is highest density of the local maxima represents maximum of the gradation area, at the second image the background portion density represents lowest density of the gradation field, the letter density which is maximum of the local maxima represents a value which is inverted highest pixels of the local maxima of the first image.

20 Claims, 9 Drawing Sheets

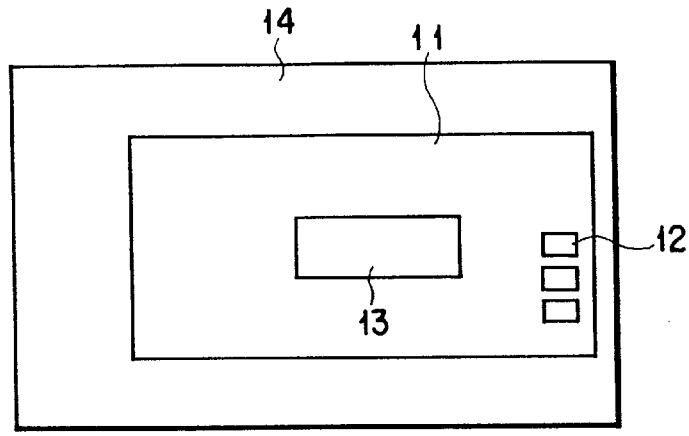
F I G. 2
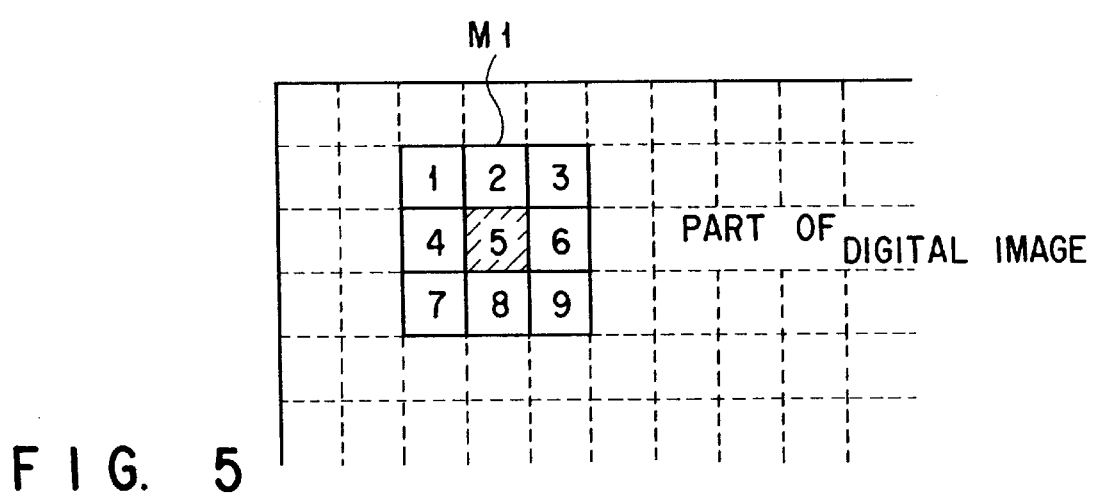
F I G. 5
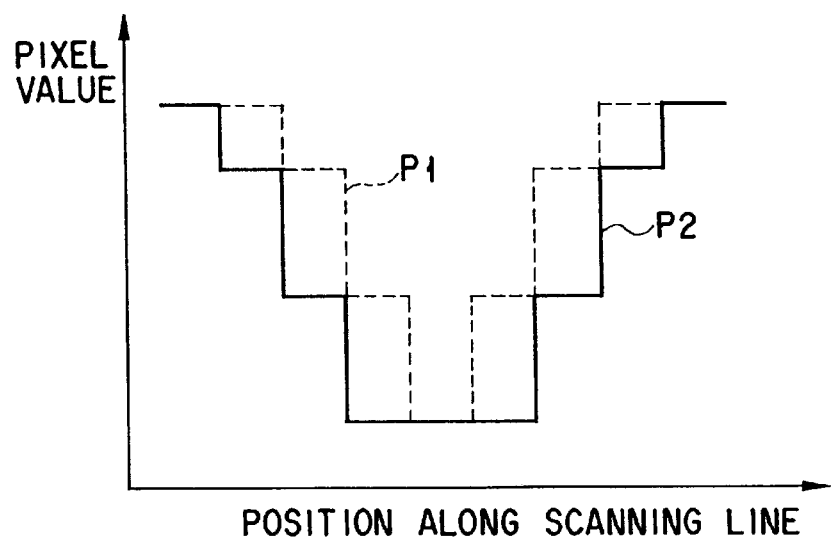
F I G. 6

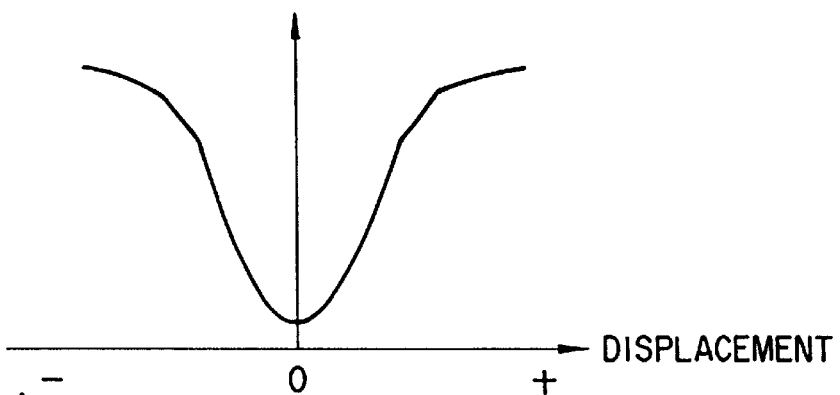
FIG. 11
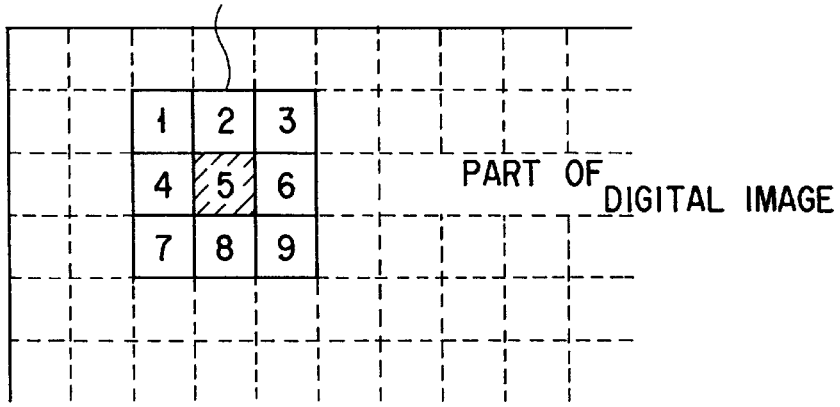
FIG. 13
FIG. 14

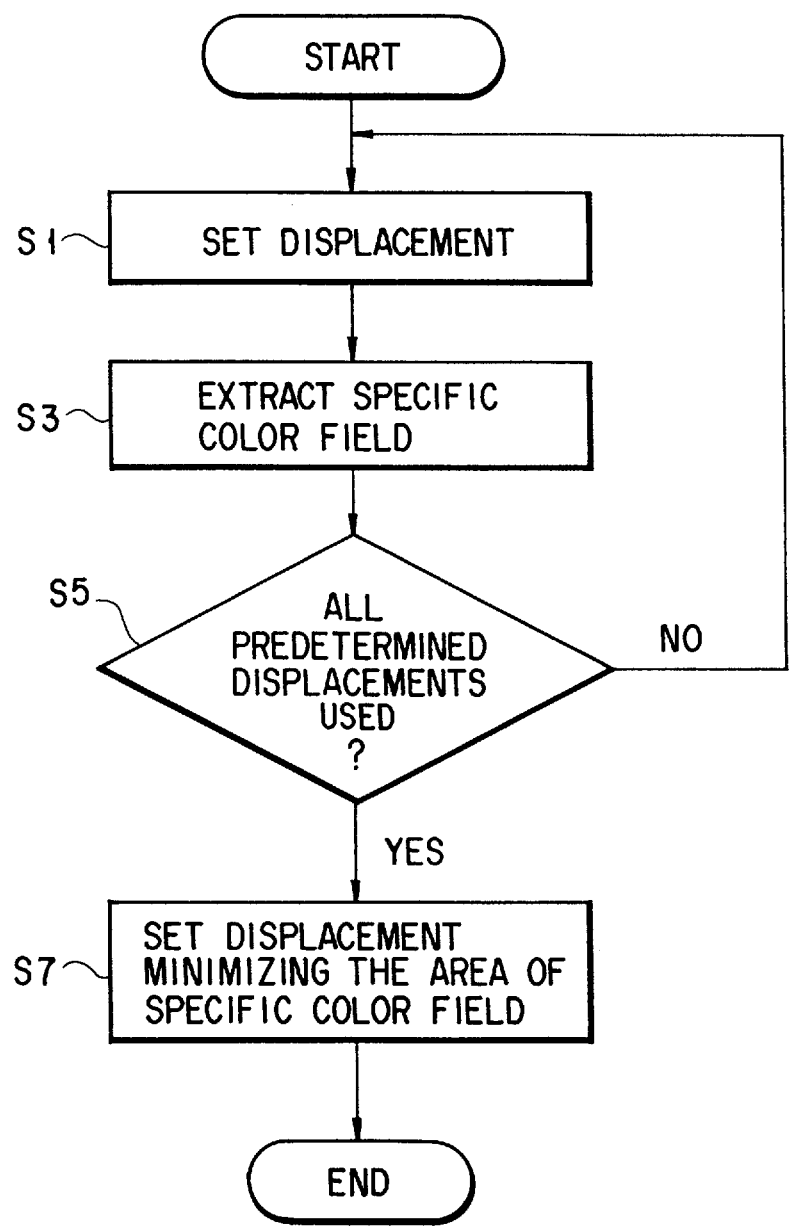
F I G. 12

SPECIFIC COLOR FIELD RECOGNITION APPARATUS AND METHOD

BACKGROUND OF THE INVENTION

1. Field of the Invention

The present invention relates to a specific color field recognition apparatus and method used with a mail processing system for recognizing red areas such as postal number frames or a postal franker mark printed or stamped on the mail surface from an image of such a mail.

The present invention also relates to a specific color field elimination apparatus and method for producing an image lacking the specific color field recognized by the specific color field recognition apparatus and method.

2. Description of the Related Art

In a conventional technique for recognizing a specific color field used with a mail processing system, for example, red frames (postal number frames) or a postal franker mark in a letter image are recognized. With this technique, two types of image signal are used. One, produced through a red filter, fails to pick up the red area, and the other picks up the red area. After the former signal is processed to thicken the low-density portion, a predetermined offset value and a letter base density signal are added to it. With the resulting signal as a threshold level, the image signal that has picked up the red area is binarized by an analog signal processing, thereby discriminating the red area from areas of other colors.

Also, there is an image signal production technique having a high rate of red color elimination, in which the red portion of an image signal not completely removed by a red filter is replaced with a letter base density signal.

The conventional techniques described above, however, have the problem of a low allowance against the letter base color in view of the fact that the binarization conditions are not changed with the amplitude of the input image signal which is varied with the color or density variations of the letter base.

Also, since the thickening process is performed only along the main scanning direction, the allowance is low against the displacement in the subsidiary scanning direction.

Further, the letter base density signal holds the maximum value of a letter image signal in the process of scanning along a scanning line. In the case where a label or the like brighter than the letter base exists in the letter, therefore, the red area is erroneously recognized when the portion scanned after the label is processed, thereby leading to an erroneous red color elimination.

SUMMARY OF THE INVENTION

An object of the present invention is to provide a specific color field recognition apparatus and method in which an allowance can be increased against the variations in the base or the color density of an object having a specific color field to be recognized thereby to recognized and/or eliminate the specific color field with high performance and high quality.

According to the present invention, there is provided a specific color field recognition apparatus comprising means for picking up an image of an object having a specific color field to be recognized and outputting a first image including the specific color, means for outputting a second image of the object to be recognized from which the information on the specific color is subtracted, means for producing a first density histogram and a second density histogram representing the number of pixels for each density of the first and second images, respectively, first conversion means for detecting a plurality of first densities corresponding to local maxima from the first density histogram and converting the density of the first image into a third image in such a manner that a minimum of the plurality of first densities represents the lowest density value of a third density histogram of the third image and a maximum of the plurality of first densities represents the highest density value in the third density histogram, second conversion means for detecting a plurality of second densities corresponding to local maxima from the second density histogram and converting the density of the second image into the fourth image in such a manner that a minimum of the plurality of the second densities represents the lowest density of a fourth density histogram of the fourth image, and a third density which having maximum pixels of the second densities, represents a fourth density which is converted by thee first conversion means, the fourth density having maximum pixels of the first densities; and means for recognizing the specific color field from the first image on the basis of the third image and the fourth image.

The recognition means further comprises means for subtracting the fourth image by an offset value calculated on the basis of the density conversion ratio of the first and second density conversion means and binarizing the third image with the resulting fourth image as a threshold level thereby to detect the specific color field.

The present invention having the above-mentioned structure has the effects described below. More specifically, the specific color field recognition apparatus and method according to the invention are intended to remove the effect of deflection of a density histogram due to a filter of a specific color when detecting a specific color field by comparing an original image signal with an image signal passed through the specific color filter.

In other words, the background density, the letter density and the label density in an original image and a drop-out image are taken into consideration. The original image and the drop-out image are converted in density to a new original image and a new drop-out image, respectively, in such a manner that at the first images the background density represents the lowest density of a gradation and the label density represents the highest density of the gradation, at the second images background image represents lowest density of the gradation field, and the letter density represents the density inverted letter density of the first image. As a result, as shown in FIG. 4, the deflection of the density histogram for the drop-out image due to the filter is corrected, so that the original image and the drop-out image can be compared faithfully with each other. Consequently, unlike in the conventional case of comparing a drop-out image with an original image simply by adding a constant to the drop-out image, each image is converted in density appropriately in accordance with the background, letter and label densities before comparison. A specific color field can thus be accurately recognized without being affected by the variations in the background, letter or label density.

Furthermore, the above-mentioned recognition means performs the binarization a(cording to the offset value calculated on the basis of the density conversion ratios, and therefore the offset value can be set according to the background, letter and label densities. Even in the case where the background density changes or a specific color field of an envelope with a large, bright label, therefore, a stable field detection by binarization meeting various situations can be realized according to the invention in which a constant is not used for binarization unlike in the prior art.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

FIG. 2 is a diagram showing an image example of a letter constituting an object of recognition;

FIG. 5 is a diagram showing an example of a thickening mask used for explaining a thickening unit;

FIG. 6 is a diagram showing an example change of pixel values by thickening used for explaining the thickening unit;

FIG. 11 is a diagram for explaining the relationship between the displacement and the recognition factor;

FIG. 12 is a flowchart for explaining the processing of a displacement correction amount detection unit;

FIG. 13 is a diagram showing an example of a red field eliminating mask used for explaining a red field eliminated image production unit; and FIG. 14 is a diagram showing an example change of the pixel value by the red field elimination processing used for explaining the red field eliminated image production unit.

DETAILED DESCRIPTION OF THE PREFERRED EMBODIMENTS

Embodiments of the present invention will be described below with reference to the accompanying drawings. Although the explanation refers to the case in which the specific color is red, the invention of course is applicable with equal effect to other colors such as blue and green.

FIG. 2 shows an example image of a letter (mail) providing an object of recognition. A letter 11 has red frames 12 as a postal number column printed in red on the surface thereof. Further, an address label 13 is applied on the surface of the letter 11. The image also shows a background portion 14 of the letter 11. The address label 13 normally constitutes a bright portion which is bright as compared with the base density of the letter 11.

Figure 1A:
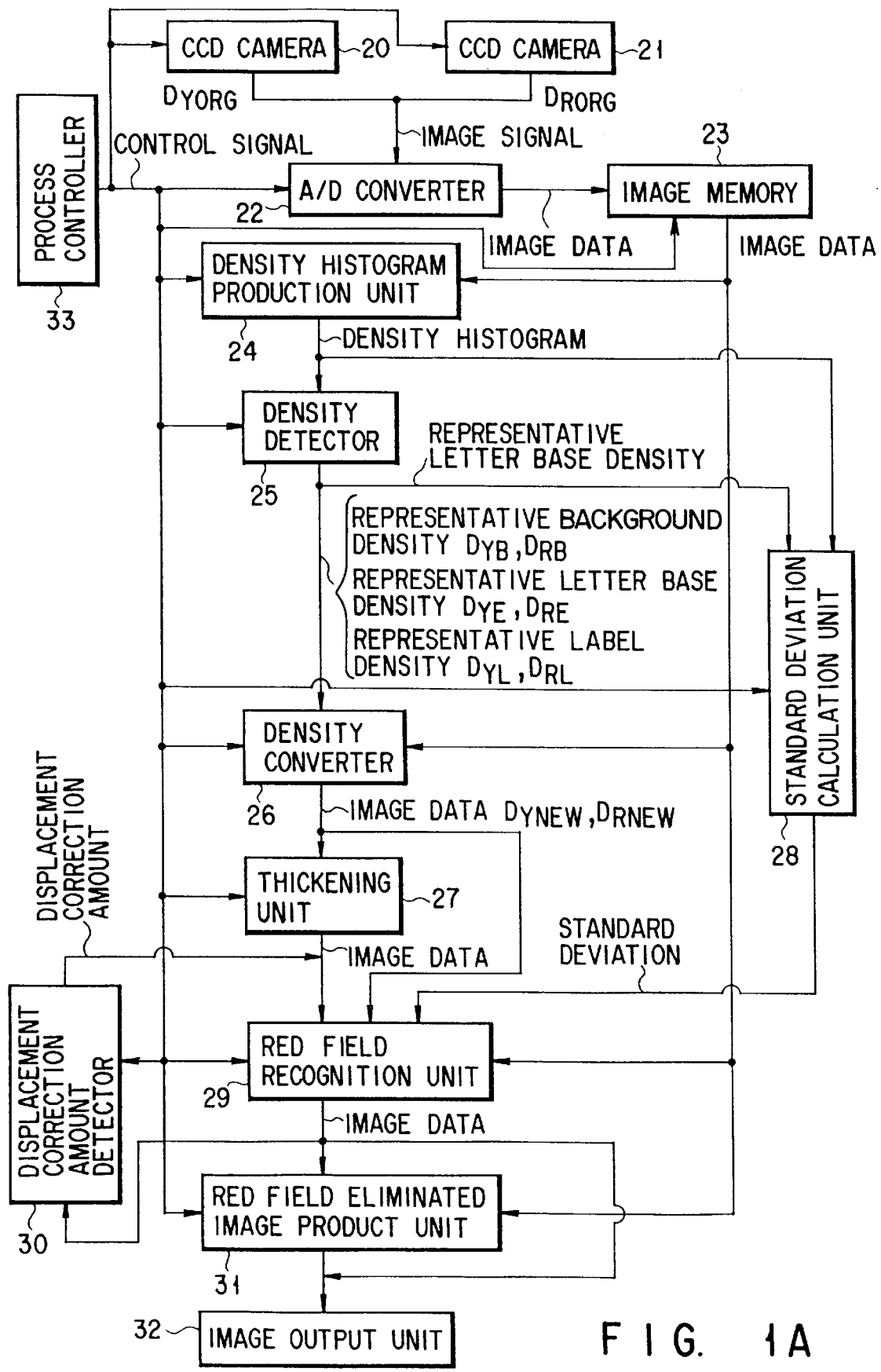
FIG. 1A is a block diagram schematically showing a specific color field recognition apparatus and method according to an embodiment of the present invention.

FIG. 1A shows a configuration of a specific color field recognition apparatus according to the present invention. This apparatus comprises at least a video camera using a CCD imaging device as imaging means (hereinafter referred to merely as a CCD camera) for picking up an image of a letter 11 as shown in FIG. 2. With this apparatus, a red field such as red frames 12 printed or stamped on the letter 11 is automatically recognized using two types of images including a red drop-out image (second image), which has failed to pick up the red frames 12 or has picked up the red frames but substantially difficult to discriminate from other colors, and a non-drop-out image (first image) with the red frames 12 picked up. In the description that follows, the red drop-out image means an image with a specific color (red) field not picked up or picked up but substantially difficult to discriminate from other colors, and the non-drop-out image means an image with a specific color field picked up.

In FIG. 1A, a red drop-out image signal and a non-drop-out image signal picked up by imaging CCD cameras 20, 21 are converted into a digital image by an A/D converter 22. These two types of images are stored in an image memory 23 as original images and referred to as required in subsequent processes. A density histogram production unit 24 produces a density histogram representing the number of pixels for each tone of an image from the two original images stored in the image memory 23.

A density detector 25 detects the density of the base of the letter 11 (which may be called the letter base), the density of the background 14 lacking an image of the letter 11 and the density of the address label 13, if any, using the density histogram produced by the density histogram production unit 24.

A density converter 25 converts the density of the images using the base density of the letter 11, the background density and the density of the address label 13. In the process, a non-drop-out image is converted in density in such a manner that the background density assumes a minimum tone value and also in such a manner that the density of the address label 13 assumes a maximum value in the presence of the address label 13 and the base density of the letter 11 assumes a maximum value in the absence of the address label 13. On the other hand, a red drop-out image is converted in density in such a manner that the background density assumes a minimum tone value and the base density of the letter 11 assumes a corresponding value for a density-converted non-drop--out image.

A thickening unit 27 thickens a portion lower in tone than the surrounding portion corresponding to the letters in the red drop-out image in order to broaden the allowance of the red field recognition unit 29 described later against the displacement between the red drop-out image and the non-drop-out image.

A standard deviation calculation unit 28 is for calculating the standard deviation of the base density of the letter 11 as an index of the degree of the base density variations of the letter 11 for each of the two original images.

A red field recognition unit 29 recognizes a red field by binarizing the pixel values of the non-dropout image corresponding to those of the thickened red drop-out image with each pixel value of the thickened red drop-out image less an offset as a threshold.

A displacement correction amount detector 30 is adapted to detect the displacement between the red drop-out image and the non-drop-out image using the number of pixels in the red field recognized by the red field recognition unit 29 and determine the inter-pixel correspondence for binarization by the red field recognition unit 29.

A red field eliminated image production unit 31 replaces the pixel values of the red drop-out image corresponding to the red field recognized by the red field recognition unit 29 with the base density of the neighboring letter 11. As a result, the red field portions that could not be completely removed by an optical filter or the like can be rendered indistinguishable from the case portion of the letter 11.

An image output unit 32 is for outputting a red field image and a red field eliminated image recognized by the apparatus. A process controller 33 controls the components in general.

Now, the processing operation of each component part will be described in detail.

The CCD cameras 20, 21 pick up a non-drop-out image and a red drop-out image. A method of picking up a red drop-out image is by using an optical filter that transmits only the red color to pick up a letter image. This method uses white light as an illumination. Instead of arranging a red filter before the CCD camera, red light may be used for illumination. The specific color, which is red in this embodiment, is alternatively blue or green with equal effect. Further, the means of picking up an image is not limited to the CCD camera as in the present embodiment but the vidicon or the like image pickup tube can also be used.

The A/D converter 22 digitizes each analog image signal picked up by the CCD cameras 20, 21 and converts it into a digital image signal. The number of tones of the image is determined as required. In the case of this embodiment, 256 tones of minimum 0 to maximum 255 are defined. Other tone ranges of course are possible to use.

The image memory 23 has the function of storing digital images and stores the red drop-out image and the non-drop-out image converted into a digital image by the A/D converter. Various digital images generated in subsequent processes are also stored and can be referred to as required. The image memory 23 is configured of a semiconductor memory, for example, and may have any other configuration of the same function.

Figure 3:
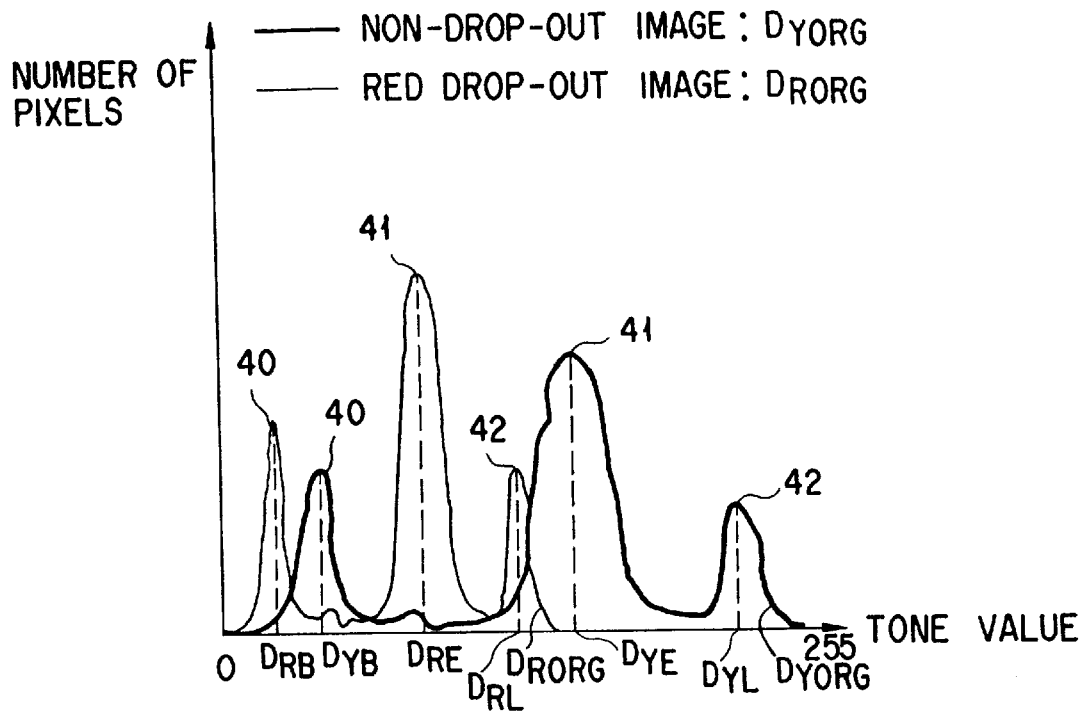
FIG. 3 is a density histogram of an original image used for explaining a density detector.

The density histogram production unit 24 produces a density histogram representing the number of pixels for each tone of the red drop-out image and the non-drop-out image stored in the image memory 23. An example of the density histogram of these images is shown in FIG. 3.

The density detector 25 determines three types of density representing the respective fields employed by the density converter 26 for each of the red drop-out image and the non-drop-out image using the density histogram produced from the density histogram production unit 24. The three types of density include the density representing the background 14, the density representing the base of the letter 11 and the density representing the portion of the address label 13, if any, shown in FIG. 2.

A method of recognizing a specific color field according to this invention will be described below with reference to FIG. 1B, etc.

Figure 1B:
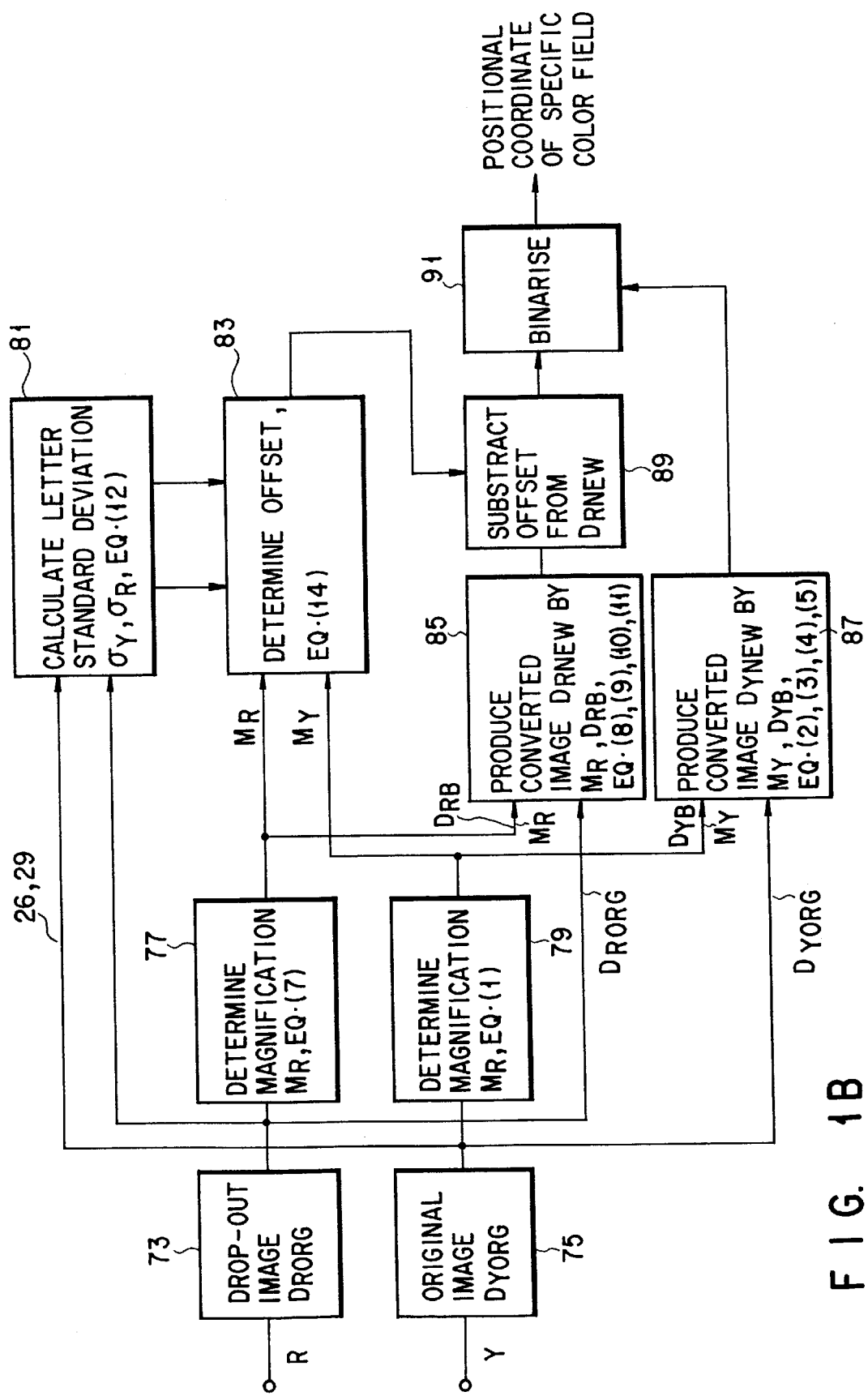
FIG. 1B is a block diagram schematically showing the essential parts of a specific color field recognition apparatus and method according to an embodiment of the invention.
Figure 4:
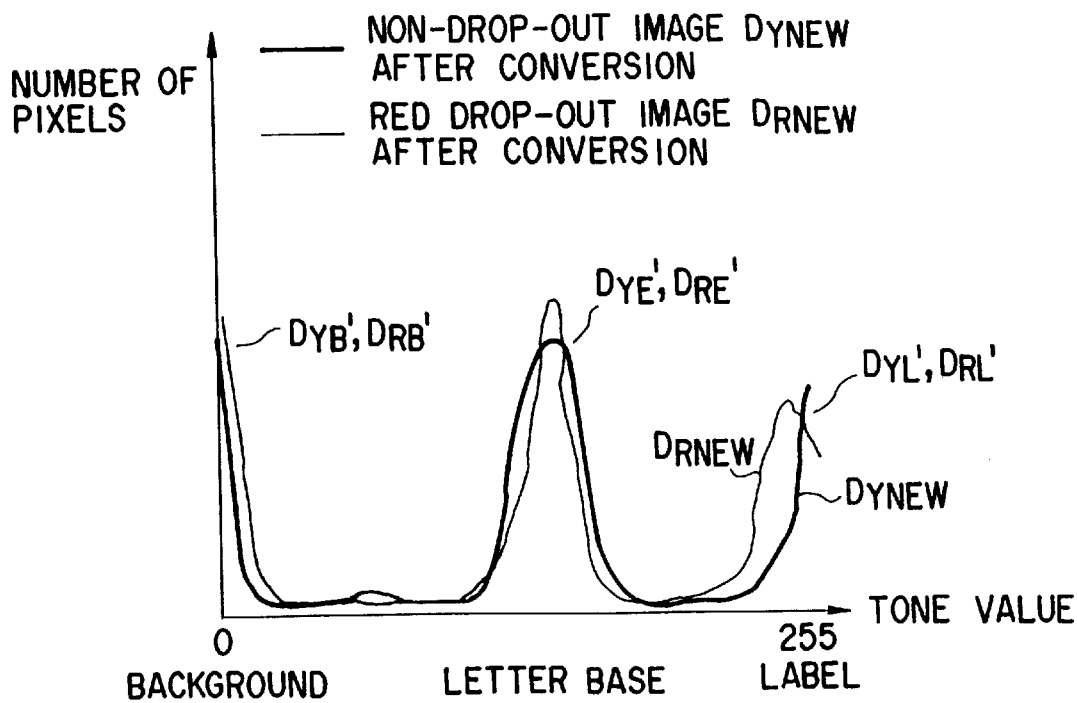
FIG. 4 is a density histogram of an image after density conversion used for explaining a density conversion unit.

FIG. 1B is a block diagram showing the essential parts of a specific color field recognition apparatus and method according to an embodiment of the invention. In FIG. 1B, magnifications 77, 79 of a drop-out image $D_{RORG}$ 73 and a non-drop-out image $D_{YORG}$ 75 are determined in accordance with equations (1) to (11) shown below for appropriate density conversion. Further, the density is converted according to the magnifications $M_R$, $M_Y$, so that the images shown in FIG. 3 are converted into images $D_{RNEW}$, $D_{YNEW}$ as shown in FIG. 4. In this way, the deflection of the drop-out image due to a filter or the like is corrected, and a detailed comparison with a non-drop-out image becomes possible.

Furthermore, an offset value is subtracted from the drop-out image $D_{RNEW}$ for the purpose of binarization (89). This offset value, unlike in the prior art, is not a constant, but is determined according to equation (14) as a value corresponding to the magnifications $M_Y$, $M_R$ used for density conversion and the standard deviations ($\sigma Y$, $\sigma R$ of letter density. With the drop-out image $D_{RNEW}$ less the offset value as a threshold level, the binarization process is performed (91) thereby to calculate the coordinate of the specific color field to be determined.

The steps of this process will be described in detail below.

In the letter image of FIG. 2, the background 14 is black. This is an area of the smallest tone in the image, and in FIG. 3, corresponds to a portion (background) 40 smallest in tone among the three local maxima having a comparatively large number of pixels. The base portion of the letter 11, which has the largest area but is irregular in tone due to the wrinkles or the like of the letter surface, corresponds to the peak or the neighborhood thereof of the portion (letter base) denoted by numeral 41 in FIG. 3. Further, in the case where an address label 13 or the like is attached on the letter 11, the tone of the label portion is often higher than that of the letter base, with the tone values being concentrated at a peak or the neighborhood thereof as denoted by numeral 42 in FIG. 3.

These features are used to detect representative background densities $D_{YB}$, $D_{RB}$, representative letter base densities $D_{YE}$, $D_{RE}$, and representative label densities $D_{YL}$, $D_{RL}$. For this purpose, while changing the tone value from minimum to maximum, for example, from 0 to 255, local maxima of the number of pixels included in a predetermined tone range are recorded. The tone range is predetermined so that a local maximum for the letter base, but not the label, assumes a highest value.

Instead of this operation, a method may be used in which local maxima are recorded progressively after smoothing the waveform of a density histogram over an appropriate scale. In this case, the smoothing scale corresponds to the predetermined tone range. A tone value associated with the highest local maximum value is used as a representative density of the letter base, and a tone value associated with a local maximum lower than the representative letter base density, if any, is assumed as a representative background density. Also, a tone value associated with a local maximum higher than the representative letter base density, if any, is employed as a representative density of the address label 13.

The density converter 26 performs the following conversion operations for the representative densities of the background, the letter base and the label determined for the non-drop-out image and the red dropout image detected by the density detector 25. First, with respect to the non-drop-out image, the densities are converted according to equations (1), (2), (3), (4) and (5) below in such a manner that the background density of an original image assumes a minimum tone value, say, 0, and the label density assumes a maximum value, say, 255. In the absence of the address label 13, conversion is made in such a manner that the letter base density assumes a maximum value. In the process, the representative letter base density of the converted non-dropout image is given by equation (6) below.

$$M_Y = (\text{max. tone} - \text{min. tone})/(D_{YL} - D_{YB}) \tag{1}$$

$$D_{YTMP} (D_{YORG} - D_{YB}) \times M_Y + \text{min. tone} \tag{2}$$

$$D_{YNEW} = D_{YTMP} \tag{3}$$

(where $D_{YTMP}$ is included between min. and max. tone values)

$$D_{YNEW} = \text{Min tone} \tag{4}$$

(where $D_{YTMP}$ is less than min. tone value)

$$D_{YNEW} = \text{Max. tone} \tag{5}$$

(where $D_{YTMP}$ is larger than max. tone value)

$$D_{YENEW} = (D_{YE} - D_{YB}) \times M_Y + \text{min. tone} \tag{6}$$

where
$D_{YORG}$: density of non-drop-out image before conversion
$D_{YNEW}$: density of non-drop-out image after conversion
$D_{YENEW}$: representative letter base of non-drop-out image after conversion
$D_{YL}$: representative label density of non-drop-out image
$D_{YE}$: representative letter base density of non-drop-out image
$D_{YB}$: representative background density of non-drop-out image
$M_Y$: magnification of non-drop-out image With regard to the red drop-out image, on the other hand, densities are converted according to equations (7), (8), (9), (10) and (11) in such a manner that the background density of the original image assumes the minimum tone value, and the representative letter base density (first specified value) assumes a value equal to the representative letter base density (second specified value) of the non-drop-out image after conversion.

$$M_R = (D_{YENEW} - \text{min. tone value})/(D_{RE} - D_{RB}) \tag{7}$$

$$D_{RTMP} (D_{RORG} - D_{RB}) \times M_R + \text{min. tone value} \tag{8}$$

$$D_{RNEW} = D_{RTMP} \tag{9}$$

(where $D_{RTMP}$ is included between min. and max. tone values)

$$D_{RNEW} = \text{min. tone value} \tag{10}$$

(where $D_{RTMP}$ is less than min. tone value)

$$D_{RNEW} = \text{max. tone value} \tag{11}$$

(where $D_{RTMP}$ is higher than max. tone value)
where $D_{RORG}$: density of drop-out image before conversion
$D_{RNEW}$: density of drop-out image after conversion
$D_{RL}$: representative label density of drop-out image
$D_{RE}$: representative letter base density of drop-out image
$D_{RB}$: representative background density of drop-out image
$M_R$: magnification of drop-out image As a result of the above-mentioned process emphasizing the letter image, erroneous detection of a red field is reduced even in the presence of the address label 13. The red field on the address label 13, as well as the red field on the letter base, can thus be positively detected. The magnifications of equations (1) and (7) are used also for determining an offset used with the red field recognition unit 29.

In the case where the density histograms of the non-drop-out image and the red drop-out image are as shown in FIG. 3, the density histograms after conversion are as shown in FIG. 4. If the density conversion unit 26 is combined with the red field recognition unit 29, the allowance is increased for the color and density of the letter base. As a consequence, only a red field can be recognized for letter bases of various colors such as blue, yellow and pink. In addition, a red field on the address label 13 can be detected.

The thickening unit 27 sets the center of a 3×3 mask M1 on each pixel of the density-converted red drop-out image as shown in FIG. 5, and employs the smallest one of the pixel values of the positions 1 to 9 as a new pixel value. Although a square area of 3×3 pixels is shown as an example of a predetermined neighborhood, other shapes may of course be employed with equal effect.

FIG. 6 is a diagram showing the tone values of the pixels along a given scanning line. A waveform P1 denoted by dashed line represents values before the thickening process, and a waveform P2 indicated by solid line values after the thickening process. This thickening process is intended to increase the size of the portion of the red drop-out image having a smaller tone value than the neighborhood on the one hand and reduce the size of the portion of the red drop-out image larger in tone value than the neighborhood on the other.

This thickening process has the function of broadening the allowance against the displacement between the red drop-out image and the non-drop-out image for red field recognition, and also the function of reducing erroneous detection due to the individual displacement of each imaging device of the CCD cameras 20, 21. A similar effect is obtained also when an image other than a letter image is intended for.

Figure 7:
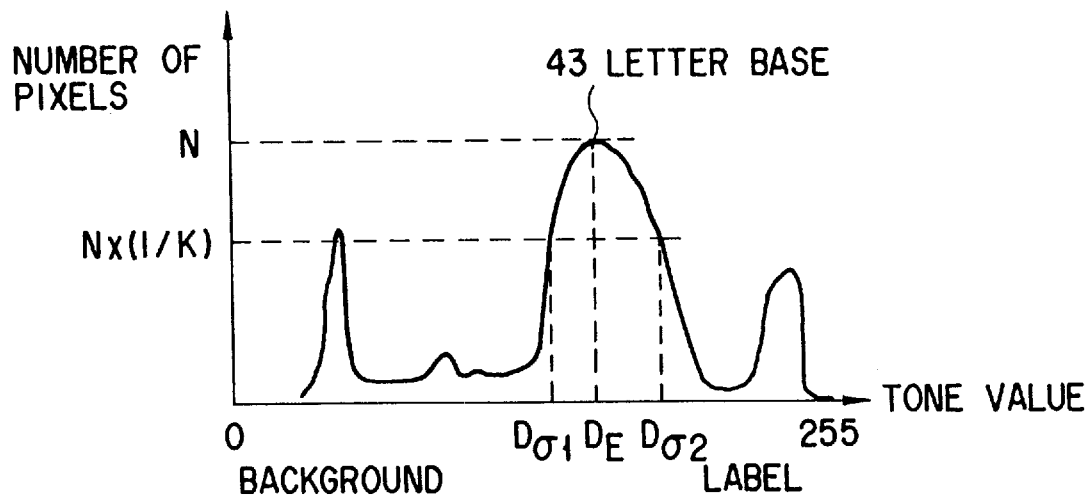
FIG. 7 is a diagram for explaining the manner in which a standard deviation is determined by a standard deviation calculation unit.

The standard deviation calculation unit 28 determines a standard deviation of the letter base density using a density histogram of an original image. The standard deviation of the letter base density is determined as follows, for example. FIG. 7 is a diagram for explaining the manner in which the standard deviation is determined. A bell-shaped waveform at and in the neighborhood of the letter base 43 in FIG. 7 corresponds to the pixels of the letter base field and is similar to the shape of a normal distribution.

Assuming that a normal distribution is approximated, therefore, neighboring densities around the waveform peak of a letter base density histogram associated with as many pixels as 1/K (K: predetermined constant) for the peak value are determined and are assumed to be $D\sigma 1$, $D\sigma 2$, respectively. From these densities, together with the peak density DE which is a representative letter base density, a value determined from equation (12) is assumed as a standard deviation $\sigma$.

$$\sigma = ((DE - D\sigma 1) + (D\sigma 2 - D_E))2 \tag{12}$$

where $\sigma$ is the standard deviation, DE is the representative letter base density, $D\sigma 1$ is the density associated with as many pixels as 1/K for the peak value ($D\sigma 1 < D_E$), $D\sigma 2$ the density associated with as many pixels as 1/K for the peak value ($D\sigma 2 > D_E$), and K is a predetermined constant.

In the case where the shape of the peak is considerably different from the assumed normal distribution, i.e., in the case where the letter 11 has a pattern of a multiplicity of pixels with a density near to the letter base density, for example, the standard deviation determined by this method is not proper. In such a case, the standard deviation determined is larger than the true standard deviation of the letter base density. Since the offset value used for the red field recognition unit 29 described later thus is larger than the proper value, the detection performance is deteriorated, but without increasing the cases of erroneous detection. Other methods of calculating the standard deviation of course are also applicable.

The red field recognition unit 29, as seen from equation (13) below, recognizes only a red field by binarizing the pixel values of the non-drop-out image corresponding to those of the thickened red drop-out image with each pixel value of the thickened red drop-out image less a predetermined offset as a threshold level.

Figure 8:
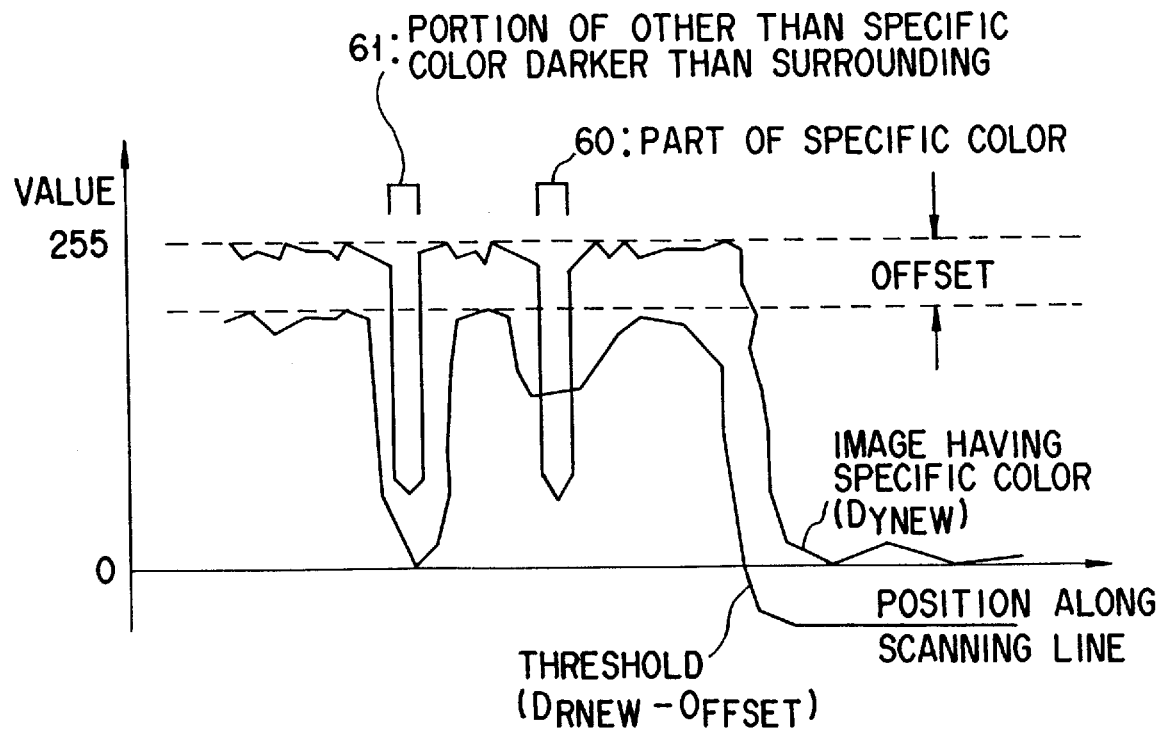
FIG. 8 is a diagram showing the manner in which the tone value changes along the scanning line used for explaining a red field recognition unit.

The manner in which the tone value changes along the direction of a given scan line is shown in FIG. 8. The right portion represents a specific color portion 60, i.e., a red field according to this embodiment. The left portion, on the other hand, indicates a field 61 darker than the surrounding fields other than a specific color field, i.e., a character field for the letter image according to this embodiment. The image may have some drop-out failure depending on the specific color to be recognized and the characteristics of the filter used for picking up the drop-out image. As far as the conditions of equation (13) below are satisfied, however, a drop-out color can be recognized.

Although the present embodiment refers to the case in which the density conversion and the thickening process were performed on a specific color drop-out image and a non-drop-out image for binarization, a configuration lacking these processes of course is also possible.

The offset for determining a threshold level has the effect of reducing the erroneous detection for binarization attributable to the density variations caused by the noise components of the image. The amplitude of the noise component of the image is substantially proportional to the standard deviation of the pixel value of the letter base portion.

$$D < D_{th} - O_{ffset} \quad (13)$$

where D is the pixel value of a non-drop-out image, $D_{th}$ is the pixel value of a specific color drop-out image, and Offset is an offset.

Figure 9:
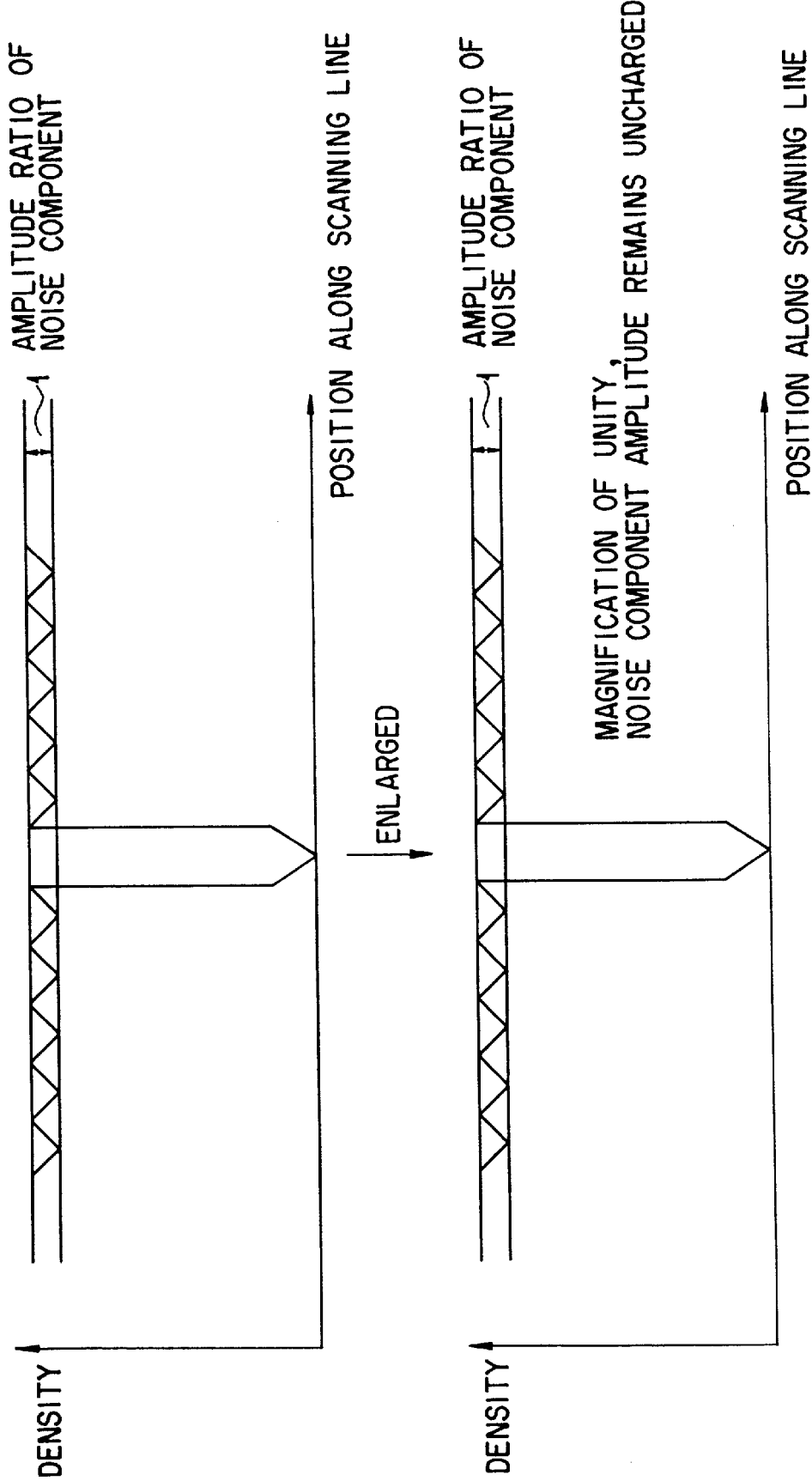
FIG. 9 is a diagram for explaining the amplitude change of a noise component caused by density conversion for the case of unity in magnification.
Figure 10:
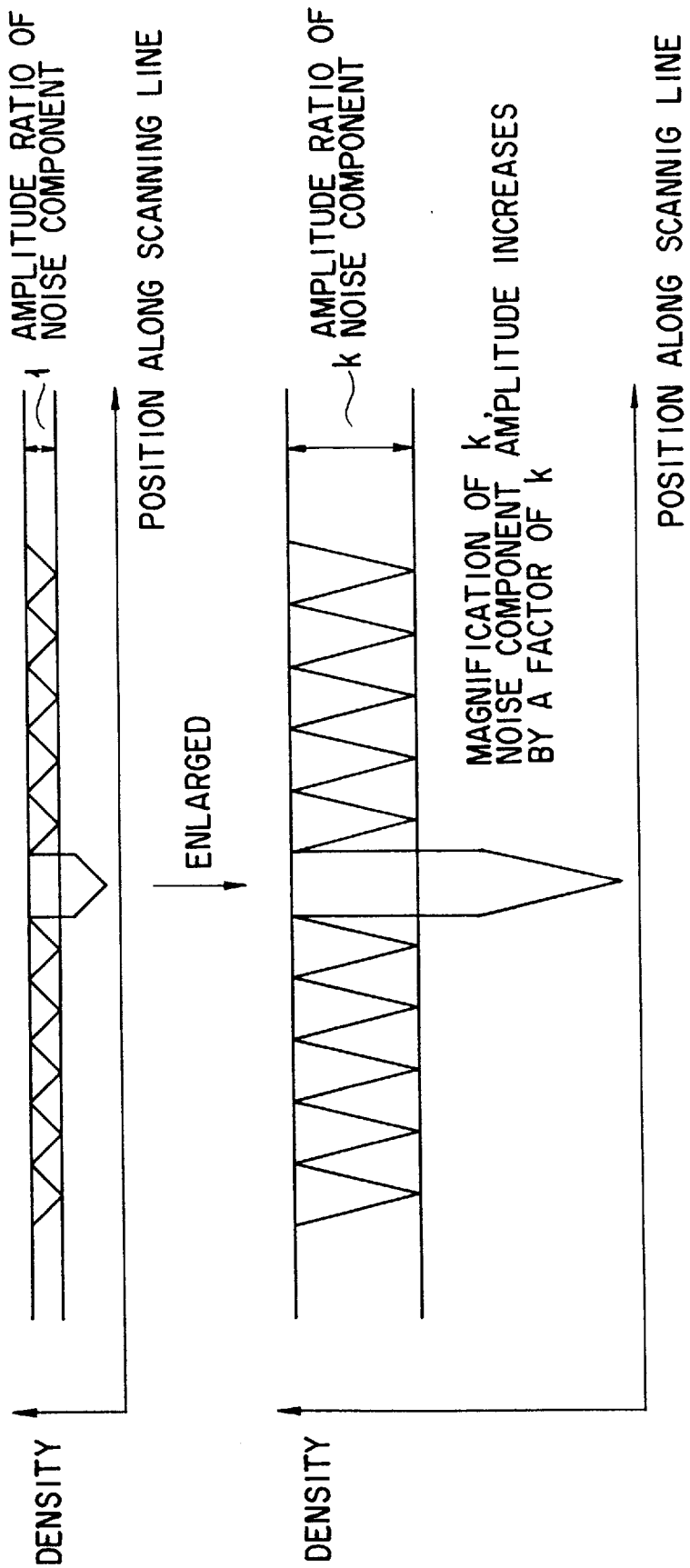
FIG. 10 is a diagram for explaining the amplitude change of a noise component caused by density conversion for the case of k in magnification.

As shown in FIGS. 9 and 10, the amplitude of the density variation component depends to a large measure on the magnification difference for density conversion. The offset value, therefore, as shown by equation (14), is determined by the magnification for density conversion and the standard deviation of the letter base density. As a result, even in the case where the density variations of the letter base portion are large or the contrast of the original image is small with a large magnification for density conversion, the red field with a small chance of erroneous recognition can be successfully recognized. It is of course possible to detect a specific color field by a similar method also for a specific color other than red.

$$\text{Offset} = M_Y \times (P \times \sigma Y + Q) + M_R \times (R \times \sigma R + S) \quad (14)$$

where $M_Y$: magnification of the non-drop-out image
$M_R$: magnification of the red drop-out image
$\sigma Y$: standard deviation of letter base density of non-drop-out image
$\sigma R$: standard deviation of letter base density of red drop-out image
P, Q, R, S: a predetermined constant The displacement correction amount detector 30 automatically detects the displacement amount between the red drop-out image and the non-drop-out image, and changes the pixel correspondence for binarization at the red field recognition unit 29, thereby reducing the effect of the displacement. FIG. 11 shows a change of a recognition factor which is the number of pixels of a red field recognized when the two types of image described above are displaced along a given scanning line. In many cases, the recognition factor assumes a minimum value in the absence of displacement, and tends to increase with the displacement amount. This is due to the fact that the red field erroneously recognized increases with the degree of displacement.

In view of this, a displacement range is predetermined by the steps shown in the flowchart of FIG. 12 (S1), and the displacement amount is changed within this range while the red field is recognized repeatedly (S3, S5), thereby determining a displacement amount associated with a minimum recognition factor (S7). The displacement amount associated with a minimum recognition factor may fail to coincide with an actual displacement amount depending on the original image. The displacement can be corrected appropriately, however, by performing the above-mentioned processing on a plurality of original images and using the resulting average value.

This displacement correction is automatically performed at the time of starting or during the operation of the apparatus. Intervals between adjusting jobs can thus be lengthened, thereby leading to a labor saving. A similar effect of course can be obtained for a specific color other than red.

The red field eliminated image production unit 31 replaces the pixel values of the red drop-out image corresponding to the red field determined by the red field recognition unit 29 with the neighboring letter base density. In the case where the neighboring field is other than the letter image, the pixel values are replaced with those of the particular neighborhood of the specific color field. As a method of determining the pixel values to be replaced, as shown in FIG. 13, the center of a 3×3 mask M2 is set on a pixel of interest, and the average value of the pixels satisfying equation (15) other than the pixel of interest is determined and assumed to provide a new value of the pixel of interest. In the case where the mask M2 contains no pixel satisfying equation (15), the pixel values are replaced by those of the representative letter base density.

Representative letter base density−β<pixel value<

$$\text{representative letter base density} + \quad (15)$$

where β is a predetermined constant.

Although the present Embodiment refers to a square of 3×3 pixels as an example of a predetermined neighborhood, other shapes of course equally apply. In the case where the neighborhood is not the letter image, the pixel values representing the field around the specific color field is used instead of the representative letter base density. As a result, an image is produced in which the red portion that was so far difficult to remove completely by an optical filter or the like is indistinguishable from the letter base.

The image output unit 32 has the function of displaying on the screen of a CRT display the red field eliminated image and the recognition result of the red field providing an output of the apparatus, or transferring the processing result to other systems for performing various processing taking advantage of the processing result of the intention.

Applications using the recognition result of the red field and the red field eliminated image include the detection of the orientation of the letter or the detection of a field having a character using various red fields including the postal number frames printed on the letter.

The present invention of course is applicable to the recognition of a specific color field other than the red field. For example, the position of a specific-color component in a image taken on various parts is detected as an application.

As described above, according to this embodiment of the invention, the operation and functions described below are expected.

(1) In the case where the present invention is applied to a letter image, the density representing the background, the density representing the letter base and the density representing the address label are determined using the features of the density histogram of the letter image. The density conversion specific to each density is performed to improve the performance of red field recognition.

(2) As a result of performing the density conversion described above, the allowance can be enlarged against the color density differences of an object having a specific color to be recognized, while at the same time making it possible positively detect the red field on the address label.

(3) The thickening process is performed not only in one direction but in two-dimensional fashion, and therefore the allowance against the displacement can be increased.

(4) For recognition of a specific color field, the offset value used for binarization is made variable in accordance with the standard deviation of the object density and the magnification used for density conversion. Therefore, the allowance is increased against the base density variations or the color density differences of the object surface including the specific color of an object to be recognized. In applications to a letter image, for example, the offset value applied for binarization is made variable in accordance with the magnification for density conversion and the standard deviation of the letter base density. As a result, the allowance against the variations of the letter base density and the color density differences of the letter base.

(5) When producing a specific color field eliminated image, the density of the neighboring pixels or the density representing predetermined neighboring pixels is used, and therefore the quality of the specific color eliminated image can be improved. In the case where the invention is applied to a letter image with a red specific color, for example, the red field eliminated image production unit uses the neighboring letter base density or a representative value of the letter base density as a replacement value. The quality of the red field eliminated image, therefore, is considerably improved.

(6) Provision of the displacement correction amount detector facilitates the work of adjusting the apparatus while at the same time lengthening the time intervals between adjustments.

As described in detail above, according to the present invention, there is provided a specific color field recognition apparatus and method, in which the performance of specific color field recognition is improved, while at the same time increasing the allowance against both the displacement as well as the difference in the color and density of an object having a specific color field.

Also, according to the present invention, there is provided a specific color field elimination apparatus and method which can considerably improve the quality of a specific color field eliminated image.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A specific color field recognition apparatus comprising:

means for picking up an image of an object having a specific color field to be recognized and outputting a first image including the specific color;

means for outputting a second image of the object to be recognized from which information on the specific color is subtracted;

means for outputting a first density histogram and a second density histogram representing the number of pixels for each density of the first image and the second image, respectively;

first conversion means for detecting a plurality of first densities corresponding to local maxima from the first density histogram and converting the density of the first image to a third image in such a manner that a minimum of the plurality of first densities represents the lowest density of a third density histogram of the third image and a maximum of the plurality of first densities represents the highest density of the third density histogram;

second conversion means for detecting a plurality of second densities corresponding to local maxima from the second density histogram and converting the density of the second image to a fourth image in such a manner that a minimum of the plurality of the second densities represents the lowest density of a fourth density histogram of the fourth image, and a third density which having maximum pixels of the second densities, represents a fourth density which is converted by the first conversion means, the fourth density having maximum pixels of the first densities; and means for recognizing the specific color field from the first image on the basis of the third image and the fourth image.

2. A specific color field recognition apparatus according to claim 1, wherein the first conversion means includes;

means for detecting from the first density histogram the first density value with the number of pixels representing a local maximum and smallest in density value as the density of the background lacking the object, the second density value with the number of pixels representing a local maximum and higher than the first density value as the density of the portion representing the object, and the third density value with the number of pixels representing a local maximum and higher than the second density value as the density of the portion brighter than the object; and third conversion means for converting the density of the first image and outputting the third image in such a manner that the first density value assumes the smallest density value of a third density histogram of the third image and the third density value assumes the highest density value in the third density histogram;

and wherein the second conversion means includes;

means for detecting from the second density histogram the fourth density value with the number of pixels representing a local maximum and smallest in density value as the density of the background lacking the object, a fifth density value with the number of pixels representing a local maximum and higher than the fourth density value as the density of the portion representing the object, and a sixth density value with the number of pixels representing a local maximum and higher than the fifth density value as the density of the portion brighter than the object; and fourth conversion means for converting the density of the second image and outputting the fourth image in such a manner that the fourth density value assumes the smallest density value in the fourth density histogram and the fifth density value represents value which is converted second density value by the third conversion means.

3. A specific color field recognition apparatus according to claim 2, wherein the third conversion means includes:

fifth conversion means for converting the density of the first image and outputting the third image in such a manner that the second density value assumes the highest density value in the third density histogram in the absence of the third density value.

4. A specific color field recognition apparatus according to claim 1, wherein the recognition means includes;

means for reducing the fourth image by a offset value calculated on the basis of the first and second density histograms and binarizing the third image with the fourth image as a threshold level thereby to detect the specific color field.

5. A specific color field recognition apparatus according to claim 1, wherein the recognition means includes;

means for reducing the fourth image by the offset value calculated on the basis of a density conversion ratio of the first and second conversion means and the standard deviation of a density of the object, and binarizing the third image with the fourth image as a threshold level thereby to detect the specific color field.

6. A specific color field recognition apparatus according to claim 1, wherein the first and second conversion means include;

means for calculating the magnifications desirable for conversion and converting the first image and the second image into the third image and the fourth image, respectively, by linear transformation corresponding to said magnifications.

7. A specific color field recognition apparatus according to claim 1, further comprising;

means for thickening an image thereby to correct the image properly with respect to the fourth image.

8. A specific color field recognition apparatus according to claim 1, further comprising;

means for comparing the positions of the first image and the second image and, upon detection of a displacement between the two positions, eliminating the displacement by changing the correspondence between the third image and the fourth image for binarization by the recognition means.

9. A specific color field elimination apparatus comprising;

means for picking up an image of an object having a specific color field to be recognized and outputting a first image including the specific color;

means for outputting a second image of the object to be recognized from which the information on the specific color is subtracted;

means for producing a first density histogram and a second density histogram representing the number of pixels for each density of the first image and the second image, respectively;

first conversion means for detecting a plurality of first densities corresponding to local maxima from the first density histogram and converting the density of the first image to a third image in such a manner that a minimum of the plurality of first densities represents the lowest density in a third density histogram of the third image, and a maximum of the plurality of first densities represents the highest density of the third density histogram;

second conversion means for detecting a plurality of second densities corresponding to local maxima from the second density histogram and converting the density of the second image into the fourth image in such a manner that a minimum of the plurality of the second densities represents the lowest density value in a fourth density histogram of the fourth image, and a third density which having maximum pixels of the second densities, represents a fourth density which is converted by the first conversion means, the fourth density having maximum pixels of the first densities; and means for recognizing the specific color field from the first image on the basis of the third image and the fourth image; and means for eliminating the specific color field recognized by the recognition means from the first image.

10. A specific color field elimination apparatus according to claim 9, wherein the elimination means includes;

means for eliminating the specific color field by replacing the image of the specific color field of the first image with the image of the neighborhood of the specific color field.

11. A specific color field recognition method comprising the steps of:

forming an image of an object having a specific color field to be recognized and outputting a first image including the specific color;

outputting a second image of the object to be recognized from which the information on the specific color is subtracted;

producing a first density histogram and a second density histogram representing the number of pixels for each density of the first image and the second image, respectively;

a first conversion step of detecting a plurality of first densities corresponding to local maxima from the first density histogram, and converting the density of the first image into a third image in such a manner that a minimum of the plurality of first densities represents the lowest density value of a third density histogram of the third image, and a maximum of the pluralities of first densities represents the highest density value in the third density histogram;

a second conversion step of detecting a plurality of second densities corresponding to local maxima from the second density histogram and converting the density of the second image into a fourth image in such a manner that a minimum of the plurality of the second densities represents the lowest density value in a fourth density histogram of the fourth image, and a third density which having maximum pixels of the second densities, represents a fourth density which is converted by the first conversion means, the fourth density having maximum pixels of the first densities; and recognizing the specific color field form the first image on the basis of the third image and the fourth image.

12. A specific color field recognition method according to claim 11, wherein the first conversion step includes;

a substep of detecting from the first density histogram the first density value associated with the number of pixels representing a local maximum and smallest in density value as the density of the background lacking the object, the second density value associated with the number of pixels representing a local maximum and higher than the first density value as the density of the portion representing the object, and the third density value associated with the number of pixels representing a local maximum and higher than the second density value as the density of the portion brighter than the object; and a third conversion substep for converting the density of the first image and outputting the third image in such a manner that the first density value assumes the smallest density value of a third density histogram the third image and the third density value assumes the highest density value in the third density histogram;

and wherein the second conversion step includes;

a substep of detecting from the second density histogram the fourth density value associated with the number of pixels representing a local maximum and smallest in density value as the density of the background lacking the object, a fifth density value associated with the number of pixels representing a local maximum and higher than the fourth density value as the density of the portion representing the object, and the sixth density value associated with a number of pixels representing a local maximum and higher than the fifth density value as the density of the portion brighter than the object; and a fourth conversion substep of converting the density of the second image and outputting the fourth image in such a manner that the fourth density value assumes the smallest density value in the fourth density histogram and the fifth density value represents value which is converted second density value by the third conversion substep.

13. A specific color field recognition method according to claim 11, wherein the third conversion step includes;

a fifth conversion substep of converting the density of the first image and outputting the third image in such a manner that the second density value assumes the highest density value in the third density histogram in the absence of the third density value.

14. A specific color field recognition method according to claim 11, wherein the recognition step includes;

a substep of reducing the fourth image by the offset value calculated on the basis of the first and second density histograms, and binarizing the third image with the fourth image as a threshold level thereby to detect the specific color field.

15. A specific color field recognition method according to claim 11, wherein the recognition step includes;

a substep of reducing the fourth image by the offset value calculated on the basis of the density conversion ratio of the first and second conversion steps and the standard deviation of the density of the object, and binarizing the third image with the fourth image as a threshold level thereby to detect the specific color field.

16. A specific color field recognition method according to claim 11, wherein the first and second conversion steps include;

a substep of calculating the magnifications desirable for conversion and converting the density of the first image and the second image into the density of the third image and the fourth image, respectively by the linear transformation according to said magnifications.

17. A specific color field recognition method according to claim 11, further comprising;

a step of thickening an image thereby to correct the image properly with respect to the fourth image.

18. A specific color field recognition method according to claim 11, further comprising;

a step of comparing the positions of the first image and the second image, and upon detection of a displacement between these two positions, eliminating the displacement by changing the correspondence between the third image and the fourth image for binarization in the recognition step.

19. A specific color field elimination method comprising the steps of:

forming an image of an object having a specific color field to be recognized and outputting a first image including the specific color;

outputting a second image of the object to be recognized from which the information on the specific color is subtracted;

producing the first density histogram and the second density histogram representing the number of pixels for each density of the first image and the second image, respectively;

a first conversion step of detecting a plurality of first densities corresponding to local maxima from the first density histogram and converting the density of the first image to a third image in such a manner that a minimum of the plurality of first densities represents the lowest density in a third density histogram of the third image, and a maximum of the plurality of first densities represents the highest density of the third density histogram;

a second conversion step of detecting a plurality of second densities corresponding to local maxima from the second density histogram and converting the density of the second image into a fourth image in such a manner that a minimum of the plurality of the second densities represents the lowest density value in a fourth density histogram of the fourth image, and a third density which having maximum pixels of the second densities, represents a fourth density which is converted densities by the first conversion means, the fourth density having maximum pixels of the first densities;

recognizing the specific color field from the first image on the basis of the third image and the fourth image; and eliminating the specific color field recognized in the recognition step from the first image.

20. A specific color filed elimination method according to claim 19, wherein the elimination step includes;

a substep of eliminating the specific color field by replacing the image of the specific color field of the first image with the image of the neighborhood of the specific color field.

* * * * *